United States Patent
Huang et al.

(10) Patent No.: US 8,619,440 B2
(45) Date of Patent: Dec. 31, 2013

(54) OVER CURRENT PROTECTION METHOD USED IN A SWITCHED-MODE POWER SUPPLY AND RELATED CONTROLLER

(75) Inventors: Kuo-Chien Huang, Hsin-Chu (TW); Ren-Yi Chen, Hsin-Chu (TW); Wen-Chung Yeh, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/236,670

(22) Filed: Sep. 20, 2011

(65) Prior Publication Data

US 2013/0070486 A1 Mar. 21, 2013

(51) Int. Cl.
*H02M 3/335* (2006.01)
*H02M 3/337* (2006.01)

(52) U.S. Cl.
USPC .......... 363/21.12; 363/56.1; 363/90; 363/127

(58) Field of Classification Search
USPC .......... 363/21.01, 21.04–21.05, 21.07–21.13, 363/21.15–21.18, 37, 52, 53, 55, 56.01, 363/56.03, 56.1, 77, 79, 80, 81, 82, 90, 97, 363/127, 130
See application file for complete search history.

(56) References Cited

U.S. PATENT DOCUMENTS

| | | | | |
|---|---|---|---|---|
| 5,619,402 A | * | 4/1997 | Liu | 363/20 |
| 7,265,999 B2 | * | 9/2007 | Murata et al. | 363/16 |
| 8,213,191 B2 | * | 7/2012 | Liang | 363/21.12 |
| 2011/0235371 A1 | * | 9/2011 | Liang | 363/21.12 |

FOREIGN PATENT DOCUMENTS

| | | |
|---|---|---|
| TW | I306187 | 2/2009 |
| TW | I306325 | 2/2009 |

* cited by examiner

*Primary Examiner* — Adolf Berhane
*Assistant Examiner* — Nusrat Quddus
(74) *Attorney, Agent, or Firm* — Winston Hsu; Scott Margo

(57) ABSTRACT

Control methods and controller thereof for a power supply including a power switch and an inductor. The power switch is turned on to increase the inductor current through the inductor, which is sensed to generate a current-sense signal. The current-sense signal is added up with an adjusting signal to generate a summation signal. The power switch is turned off if the summation signal is higher than a peak limit. The turn-on time of the power switch is detected to update the adjusting signal.

8 Claims, 6 Drawing Sheets

OVER CURRENT PROTECTION METHOD USED IN A SWITCHED-MODE POWER SUPPLY AND RELATED CONTROLLER

BACKGROUND OF THE INVENTION

1. Field of the Invention

The present invention is related to an over current protection (OCP) method for use in a switched-mode power supply (SMPS) and related device.

2. Description of the Prior Art

A power supply is a power management device which supplies power to electronic devices or elements after performing power conversion. FIG. 1 is a diagram of a prior art flyback power supply 60. A bridge rectifier 62 is configured to rectify an alternative-current (AC) voltage $V_{AC}$ and provide an input voltage $V_{IN}$ to an inverter 64. When a switch 72 is short-circuited, energy may be stored in the primary coil $L_P$ of the inverter 64; when the switch 72 is open-circuited, energy stored in the secondary coil $L_S$ of the inverter 64 may be discharged to a load capacitor 69 via a rectifier 66, thereby establishing an output voltage $V_{OUT}$. An error amplifier EA is configured to compare the output voltage $V_{OUT}$ with a target voltage $V_{Target}$, thereby generating a compensation signal $V_{COM}$. According to the compensation signal $V_{COM}$ and a current-sense signal $V_{CS}$, a controller 74 is configured to generate a control signal $V_{GATE}$ for operating the switch 72. The current-sense signal $V_{CS}$ is associated with the inductor current flowing through the primary coil $L_P$.

FIG. 2 is a detailed diagram illustrating the controller 74 in FIG. 1. A clock generator 76 controls a logic unit 79 so as to turn on the switch 72 periodically. Comparators 77 and 78 are configured to limit the maximum value of the current-sense signal $V_{CS}$ to a value which is the smaller one among a peak limit $V_{CS\_LIMIT}$ and the compensation signal $V_{COM}$. Over current protection may be performed by the comparator 78 and the logic unit 79 so that the current-sense signal $V_{CS}$ does not exceed the peak limit $V_{CS\_LIMIT}$.

However, after the comparator 78 detects that the current-sense signal $V_{CS}$ exceeds the peak limit $V_{CS\_LIMIT}$, there is a signal delay time before the switch 72 is actually turned off. Since the current-sense signal $V_{CS}$ continues to increase during the signal delay time, the current-sense signal $V_{CS}$ often exceeds the peak limit $V_{CS\_LIMIT}$ by an amount $\Delta V$ which varies with the input voltage $V_{IN}$. In the prior art power supply 60, the maximum power of the output voltage $V_{OUT}$ may vary with the input voltage $V_{IN}$, which is an undesirable condition to be overcome.

SUMMARY OF THE INVENTION

The present invention provides a control method applied in a power supply having a switch and an inductor coupled in series. The method includes turning on the switch for increasing an inductor current of the inductor; detecting the inductor current for generating a current-sense signal; generating a summation signal by adding the current-sense signal to an adjusting signal; comparing the summation signal with a peak limit and turning off the switch when the summation signal exceeds the peak limit; and detecting a turn-on time or a duty cycle of the switch for updating the adjusting signal accordingly.

The present invention further provides a controller for use in a power supply having a switch and an inductor coupled in series. The controller includes a logic processing unit used to turn on the switch; a comparator used to turn off the switch when a voltage at a sensing node exceeds a peak limit; and a current generator used to generate and adjust an adjusting current which flows to an end of the switch via the detecting end according to a turn-on time or a duty cycle of the switch; wherein the adjusting current is adjusted to lower when the turn-on time or the duty cycle increases and remains constant during the turn-on time or the duty cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
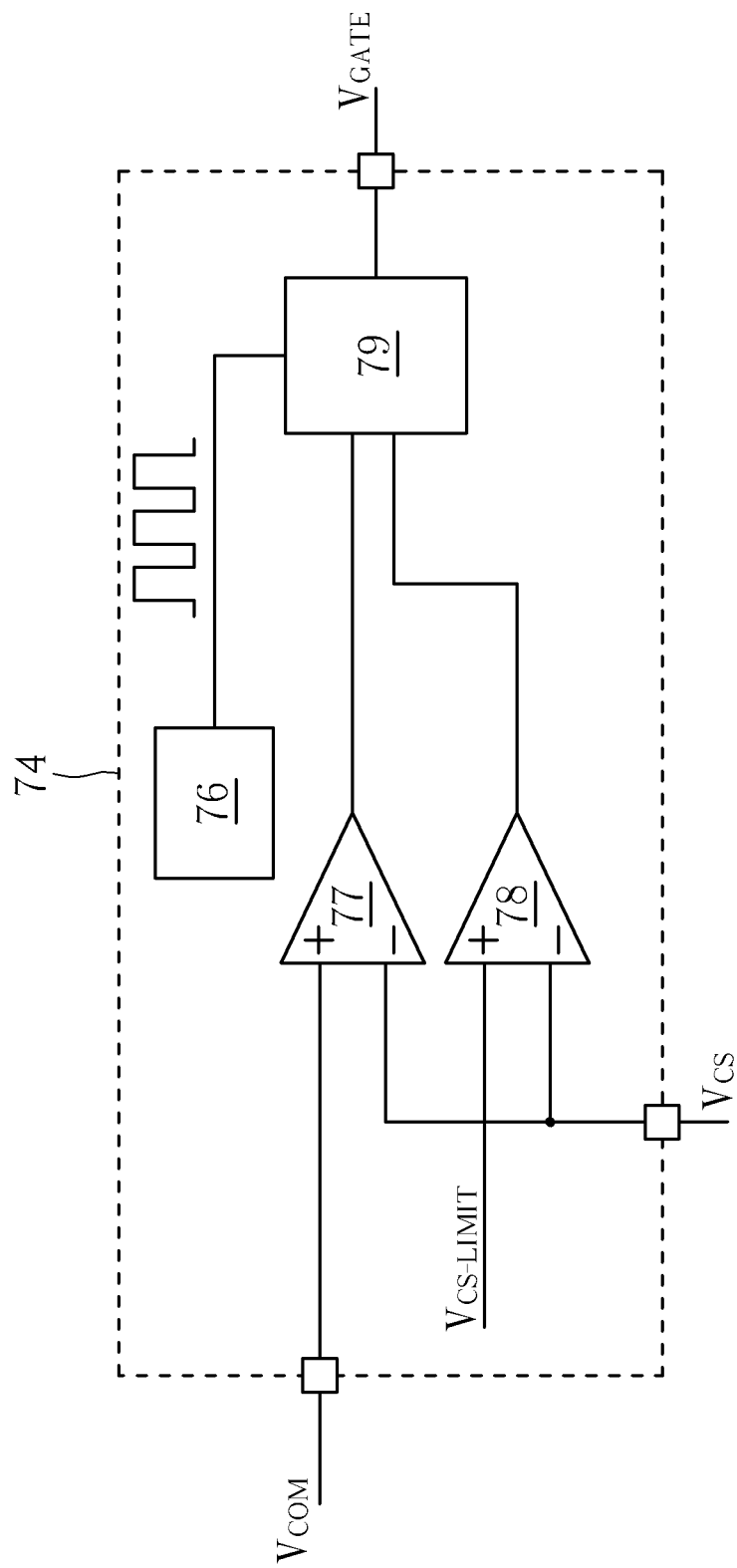
FIG. 2 is a detailed diagram illustrating a controller in FIG. 1.
Figure 3:
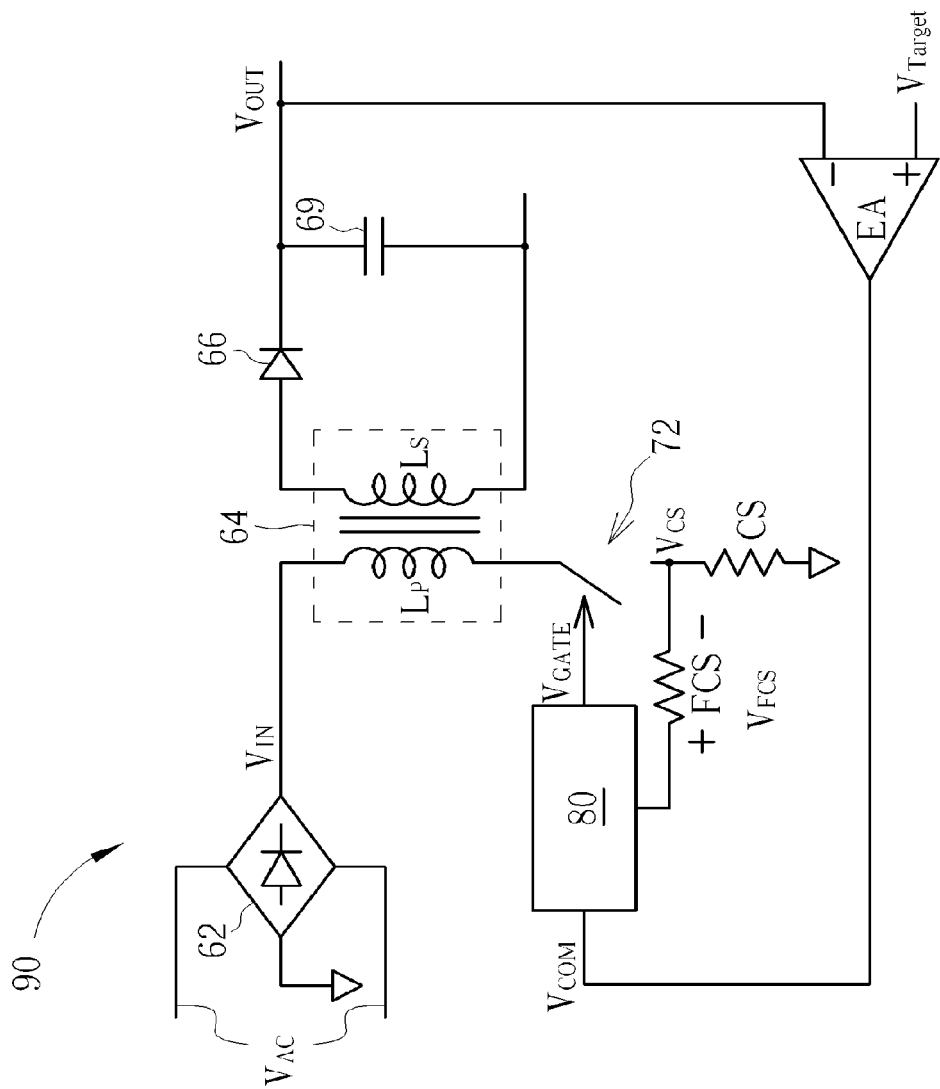
FIG. 3 is a diagram of a power supply according to the present invention.
Figure 4:
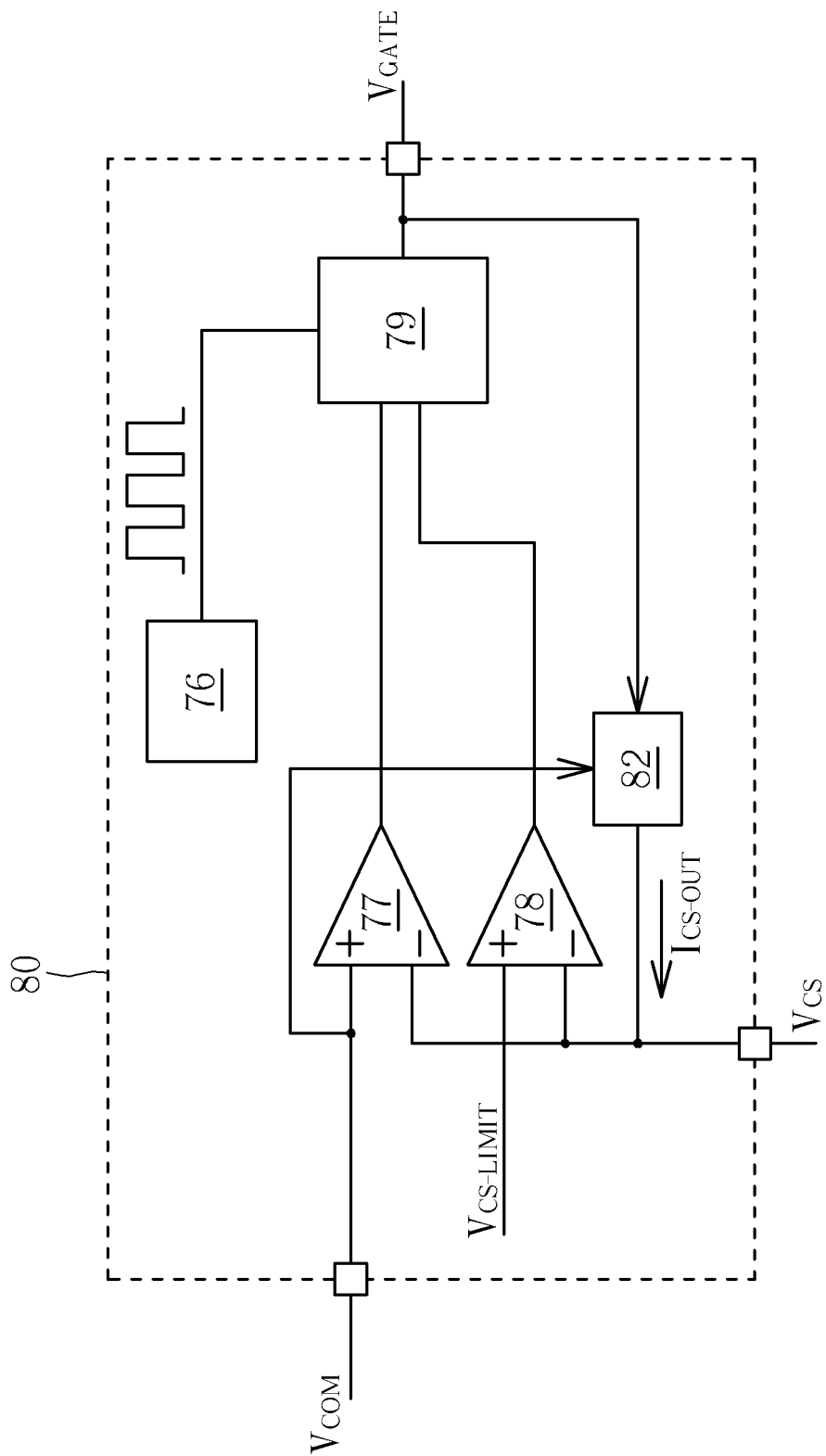
FIG. 4 is a detailed diagram illustrating a controller in FIG. 3.

FIG. 3 is a diagram of a power supply 90 according to the present invention. FIG. 4 is a detailed diagram illustrating a controller 80 in FIG. 3. For explanation purposes, components, devices or signals with equivalent or similar functionalities are represented by the same symbols in FIGS. 1-4. However, the embodiment illustrated in FIGS. 3 and 4 may adopt components, devices or signals other than those labeled by the same symbols in FIGS. 1 and 2. It is to be noted that the present invention is not limited thereto.

Figure 1:
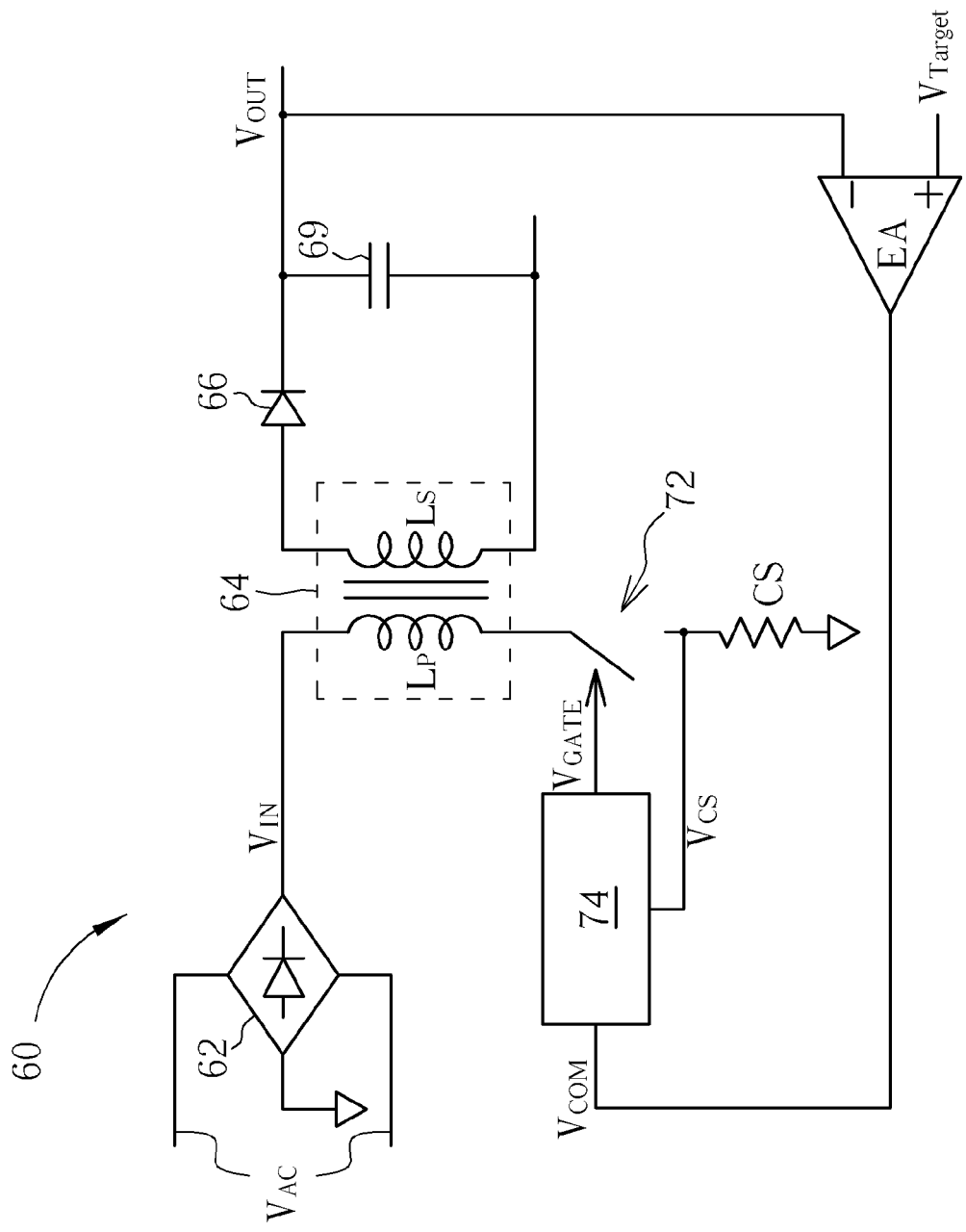
FIG. 1 is a diagram of a prior art flyback power supply.

Different from FIG. 1, an adjusting resistor FCS is further disposed between a sensing node (SS in FIG. 4) of the controller 80 and a detecting resistor CS in FIG. 3. Different from FIG. 2, the controller 80 in FIG. 4 further includes a current generator 82 for providing an adjusting current $I_{CS\_OUT}$ which flows through the adjusting resistor FCS and the detecting resistor CS via the sensing node SS. The controller 80 in FIG. 4 may be implemented using an integrated circuit which is connected to the adjusting resistor FCS via its pin.

Based on the control signal $V_{GATE}$, the current generator 82 is configured to detect the turn-on time $T_{ON}$ or the duty cycle D of the switch 72, thereby updating the adjusting current $I_{CS\_OUT}$. The duty cycle D is the turn-on time $T_{ON}$ divided by one switch period. When the switch 72 is turned on, the value of the adjusting current $I_{CS\_OUT}$ remains substantially constant. The current generator 82 provides a feedback scheme in which the adjusting current $I_{CS\_OUT}$ is altered once in a switch period so that the turn-on time $T_{ON}$ or the duty cycle D is substantially inversely proportional to the adjusting current $I_{CS\_OUT}$. For example, if the turn-on time $T_{ON}$ or the duty cycle D of the switch 72 increase in the current switch period, the adjusting current $I_{CS\_OUT}$ for the next switch period may be lowered.

Equivalently speaking, updating the adjusting current $I_{CS\_OUT}$ means updating the current limit $I_{CS\_LIMIT}$ of the inductor current $I_P$ which flows through the primary coil $L_P$. Referring to FIGS. 3 and 4, the comparator 78 is triggered when the voltage at the sensing node SS is equal to the peak limit $V_{CS\_LIMIT}$, as depicted by the following equation (1):

$$V_{CS\_LIMIT} = V_{FCS} + V_{CS} \qquad (1)$$

The adjusting signal $V_{FCS}$ is the voltage established across the adjusting resistor FCS and the current-sense signal $V_{CS}$ is the voltage established across the detecting resistor CS. The voltage at the sensing node SS is equal to the sum of the adjusting signal $V_{FCS}$ and the current-sense signal $V_{CS}$. Assuming the resistance $R_{FCS}$ of the adjusting resistor FCS is much larger than the resistance $R_{CS}$ of the detecting resistor CS, equation (1) may be summarized as follows:

$$V_{CS\_LIMIT} = I_{CS\_OUT}*R_{FCS} + I_{CS\_LIMIT}*R_{CS})$$

$$I_{CS\_LIMIT} = (V_{CS\_LIMIT} - I_{CS\_OUT}*R_{FCS})/R_{CS} \quad (2)$$

Assume that the relation between the adjusting current $I_{CS\_OUT}$ and the turn-on time $T_{ON}$ is as follows:

$$I_{CS\_OUT}*T_{ON} = K \quad (3)$$

wherein K is a constant.
Equation (2) may be summarized as follows:

$$I_{CS\_LIMIT} = (V_{CS\_LIMIT}/R_{CS}) - K*R_{FCS}/(R_{CS}*T_{ON}) \quad (4)$$

Figure 5:
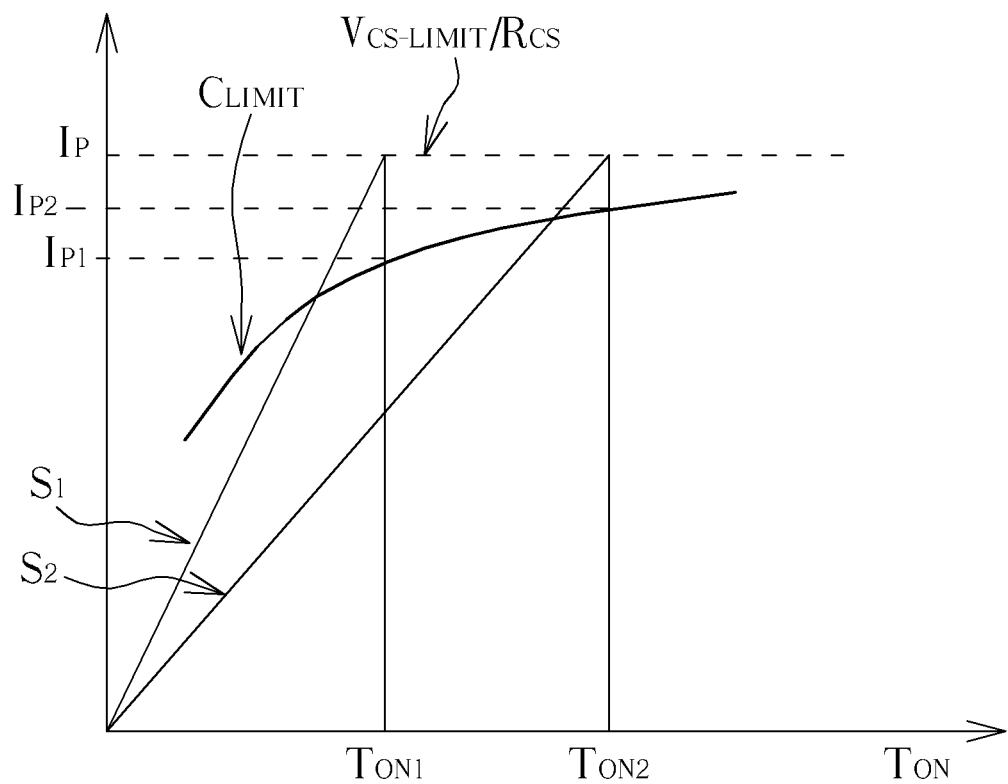
FIG. 5 is a diagram illustrating the operation of the power supply according to the present invention.

In Equation (4), $K*R_{FCS}/(R_{CS}*T_{ON})$ may be viewed as a deduction amount for reducing the original current limit ($V_{CS\_LIMIT}/R_{CS}$) corresponding to the peak limit $V_{CS\_LIMIT}$, thereby limiting the inductor current $I_P$ in advance. In FIG. 5, curve $C_{LIMIT}$ illustrates the relationship between the current limit $I_{CS\_LIMIT}$ and the turn-on time $T_{ON}$ in equation (4), and $S_1$~$S_2$ illustrate the values of the inductor current $I_P$ under different input voltage $V_{IN}$. Assuming that curve $S_1$ corresponds to a larger input voltage $V_{IN}$ and curve $S_2$ corresponds to a smaller input voltage $V_{IN}$, then $T_{ON1} < T_{ON2}$ and $I_{P1} < I_{P2}$. As depicted in FIG. 5, the maximum value of the inductor current $I_P$ may be maintained at the original current limit ($V_{CS\_LIMIT}/R_{CS}$) instead of varying with the input voltage $V_{IN}$ by selecting the appropriate $R_{FCS}$. The issues caused by signal delay may thus be solved. Meanwhile, the duty cycle D may be used in place of the turn-on time in the above-mentioned equations and embodiments of the present invention.

Figure 6:
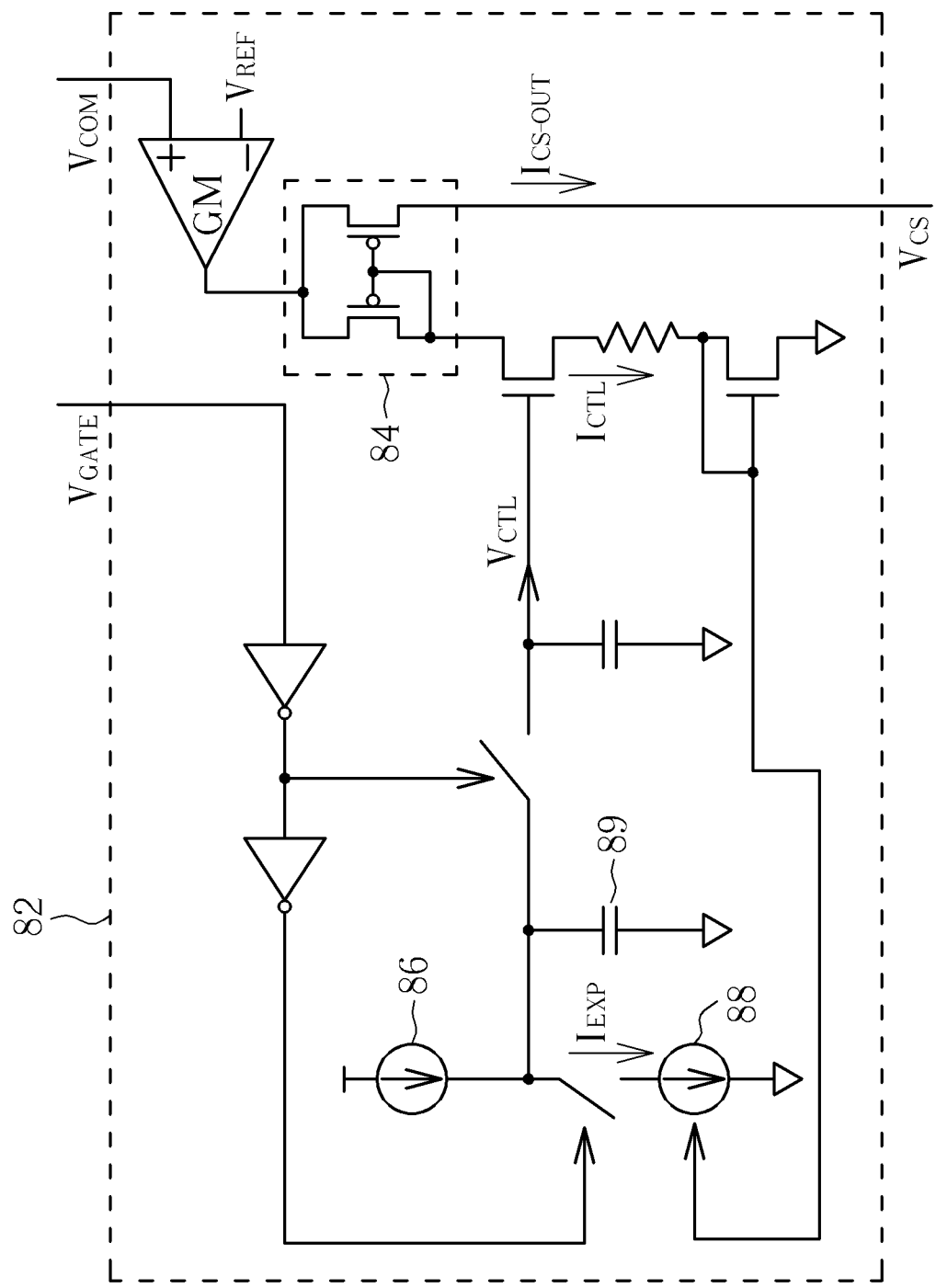
FIG. 6 is a detailed diagram illustrating a current generator in FIG. 4.

FIG. 6 is a detailed diagram illustrating the current generator 82 in FIG. 4. A constant current source 86 is configured to provide a constant current $I_{SET}$ for charging the capacitor 89. A constant current source 88 is configured to provide a constant current $I_{EXP}$ for discharging the capacitor 89 when the control signal $V_{GATE}$ is logic "1" (the switch 72 is turned on). When the switch 72 is turned on, the control signal $V_{GATE}$, which determines the current $I_{CTL}$ and $I_{EXP}$, substantially remains constant. A current mirror 84 is configured to proportionize the adjusting current $I_{CS\_OUT}$ and the current $I_{CTL}$, as follows:

$$I_{SET}*T_{CYCLE} = I_{EXP}*T_{ON} \quad (5)$$

$T_{CYCLE}$ is the switch cycle of the switch 72. For example, if $(I_{SET}*T_{CYCLE})$ is larger than $(I_{EXP}*T_{ON})$ after a switch cycle, the control voltage $V_{CTL}$, raises so as to increase the current $I_{CTL}$ and the constant current $I_{EXP}$. The feedback path from the control voltage $V_{CTL}$ to the constant current $I_{EXP}$ equalizes both sides of equation (5). The relationship between the adjusting current $I_{CS\_OUT}$ and the turn-on time $T_{ON}$ may be derived from equation (5), as follows $$I_{CS\_OUT} = K1*I_{CTL} = K2*I_{EXP} = K3*I_{SET}*T_{CYCLE}/TON \quad (6)$$

When the duty cycle D is introduced, Equation (6) may be represented as follows:

$$I_{CS\_OUT} = K3*I_{SET}/D \quad (7)$$

$I_{SET}$ and $T_{CYCLE}$ are constant. The adjusting current $I_{CS\_OUT}$ is inversely proportional to the turn-on time $T_{ON}$ or the duty cycle D.

The adjusting current $I_{CS\_OUT}$ only needs to be provided during OCP when the power supply is heavily loaded. Therefore, a transconductance comparator GM may be used as a control unit which decides whether the adjusting current $I_{CS\_OUT}$ needs to be generated by detecting the compensation signal $V_{COM}$. In FIG. 6, when the compensation signal $V_{COM}$ is lower than a predetermined value $V_{REF}$, it is determined that the power supply is lightly loaded or not loaded at all. The adjusting current $I_{CS\_OUT}$ becomes 0 and the current limit $I_{CS\_LIMIT}$ is no longer influenced by the turn-on time $T_{ON}$ or the duty cycle D.

In the embodiment illustrated in FIG. 4, the inductor current $I_P$ may be limited in advance for overcoming issues caused by signal delay time. System manufacturers may select an appropriate external adjusting resistor FCS for achieving a certain design.

Although a flyback SMPS is used for illustration, the present invention may also be applied to other types of SMPS, such as buck converters or boost converters.

Those skilled in the art will readily observe that numerous modifications and alterations of the device and method may be made while retaining the teachings of the invention.

What is claimed is:
1. A control method applied in a power supply having a switch and an inductor coupled in series, comprising:
   turning on the switch for increasing an inductor current of the inductor;
   detecting the inductor current for generating a current-sense signal;
   generating a summation signal by adding the current-sense signal to an adjusting signal;
   comparing the summation signal with a peak limit and turning off the switch when the summation signal exceeds the peak limit;
   detecting a turn-on time or a duty cycle of the switch for updating the adjusting signal accordingly;
   providing a compensation signal associated with an output voltage of the power supply; and
   comparing the compensation signal with a predetermined value and ceasing to provide the adjusting signal when the compensation signal is lower than the predetermined value.
2. The control method of claim 1, wherein the power supply further includes a detecting resistor, coupled between the switch and a power line, and an adjusting resistor, having a first end coupled to the switch and the detecting resistor, and wherein the control method further comprises:
   providing an adjusting current which flows through the adjusting resistor and whose value remains constant when the switch is turned on;
   turning off the switch when a voltage at a second end of the adjusting resistor exceeds the peak limit; and
   modifying the adjusting current according to the turn-on time or the duty cycle.
3. The control method of claim 2, further comprising:
   lowering the adjusting current when the turn-on time or the duty cycle increases.
4. The control method of claim 1, further comprising:
   charging a capacitor with a first constant current;
   discharging the capacitor with a second constant current during the turn-on time or the duty cycle; and
   modifying the second constant current and the adjusting current according to a voltage of the capacitor.

5. A controller for use in a power supply having a switch and an inductor coupled in series, comprising:
  a logic processing unit used to turn on the switch;
  a comparator used to turn off the switch when a voltage at a sensing node exceeds a peak limit; and
  a current generator used to generate and adjust an adjusting current which flows to an end of the switch via the detecting end according to a turn-on time or a duty cycle of the switch, the current generator comprising:
    a control unit configured to receive a compensation signal associated with an output voltage of the power supply, compare the compensation signal with a predetermined value, and terminate the adjusting current when the compensation signal is lower than a predetermined value;
  wherein the adjusting current is lowered when the turn-on time or the duty cycle increases and remains constant during the turn-on time or the duty cycle.

6. The controller of claim 5, wherein the power supply further comprises:
  a detecting resistor coupled between the switch and a power line; and
  an adjusting resistor having a first end coupled to the detecting resistor and the sensing node.

7. The controller of claim 5, wherein the current generator provides a feedback scheme in which the adjusting current is inversely proportional to the turn-on time or the duty cycle.

8. The controller of claim 5, wherein the current generator further comprises:
  a first constant current source for charging a capacitor;
  a second constant current source for discharging the capacitor during the turn-on time; and
  a feedback path for modifying a current of the second constant current source according to a voltage of the capacitor, wherein the adjusting current is proportional to the current of the second constant current source.

* * * * *